5811X
Z Allen.
Napping Mach.
Patented Feb. 2, 1830.
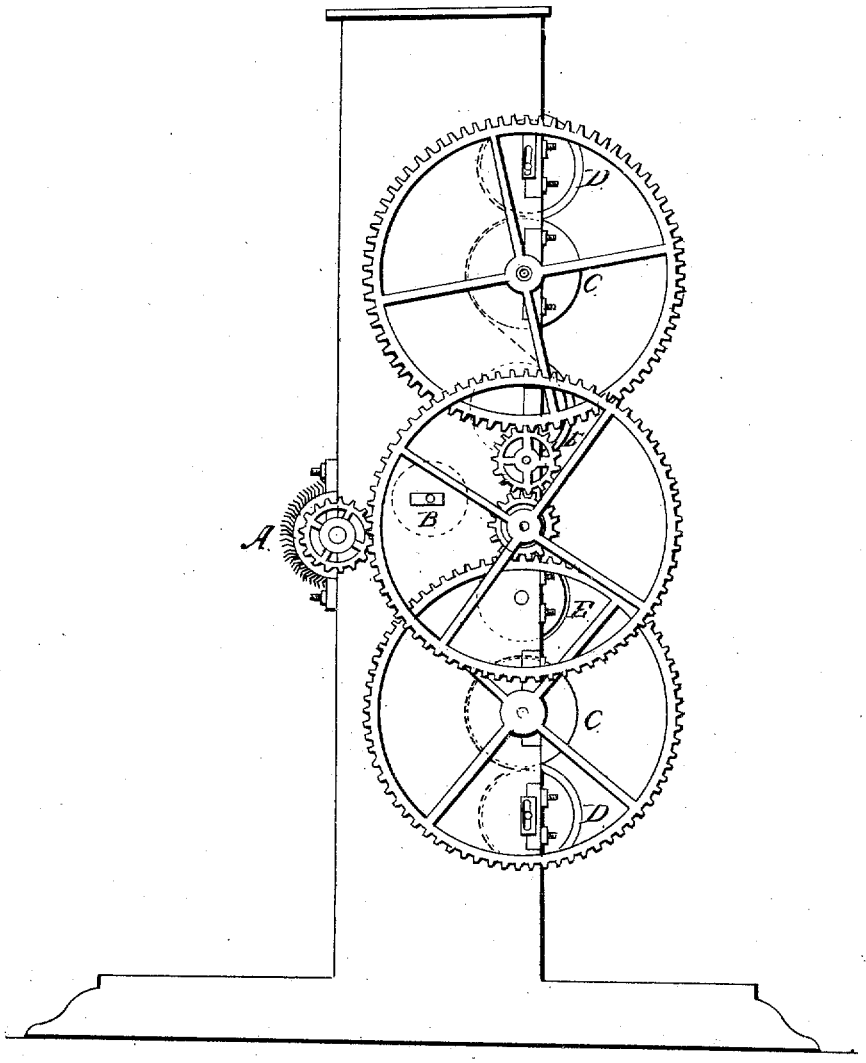
N. PETERS, PHOTO-LITHOGRAPHER, WASHINGTON, D. C.

X5811 Feb 2, 1830 411.

Zachariah Allen
Letters Patent

The Schedule referred to in these Letters Patent and making part of the same containing a description in the words of the said Zachariah Allen himself of of his improvement in the construction of a machine for forming a nap on Woollen Cloth This Improvement consists in extending the cloth, upon which it may be required to raise a nap. very smoothly ~~over~~ or firmly a solid arbor or edge. and in causing the wires or cards set on a cylinder to act only upon that portion of the cloth. which is passing in actual contact around. or over the solid arbor or edge. thus bringing the wires to act by a guage or screw. with accuracy and certainty upon all parts of the face of the cloth and at the same time to penetrate no farther or deeper into the texture of the fabric. than may be found proper to raise a nap. without injuring the texture of the cloth The improvement herein claimed consists in causing the wires to act upon a portion of the surface of the cloth extending smoothly over a solid body so that every part of the cloth thus extended on a hard surface or solid body may be brought under the action of the wires without a possibility of retracting therefrom or bagging in the looser parts. and without having some ~~portion~~ of it more intensely acted upon than others. whereby the nap is not only unequally raised: but the cloth itself subject to be chafed thro' and damaged as is the case when it is attempted to raise a nap otherwise than when extended upon a hard smooth surface or cushion. In testimony whereof that the above is a true Specification of my said improvement as by me described I have hereunto set my hand and Seal in Providence this 4th day of January A D 1830.

Witnesses
Henry Martin
Charles T. Hillinghast

Zachariah Allen [illegible]

(325 words)

[illegible]